(12) United States Patent
Saitou et al.

(10) Patent No.: US 8,196,436 B2
(45) Date of Patent: Jun. 12, 2012

(54) BASE MATERIAL FOR OPTICAL FIBER AND METHOD FOR PRODUCTION THEREOF

(75) Inventors: Mitsuo Saitou, Gunma (JP); Koichi Shiomoto, Gunma (JP); Mitsuji Sato, Ibaraki (JP); Shoji Hoshino, Ibaraki (JP); Seiya Yamada, Gunma (JP); Hiroshi Kato, Osaka (JP); Naomichi Osada, Kanagawa (JP)

(73) Assignee: Shin-Etsu Chemical Co., Ltd., Chiyoda-ku, Tokyo (JP)

( * ) Notice: Subject to any disclaimer, the term of this patent is extended or adjusted under 35 U.S.C. 154(b) by 885 days.

(21) Appl. No.: 11/666,116

(22) PCT Filed: Aug. 1, 2005

(86) PCT No.: PCT/JP2005/014064
§ 371 (c)(1),
(2), (4) Date: Oct. 5, 2007

(87) PCT Pub. No.: WO2006/046340
PCT Pub. Date: May 4, 2006

(65) Prior Publication Data
US 2008/0104999 A1    May 8, 2008

(30) Foreign Application Priority Data
Oct. 25, 2004   (JP) .................................. 2004-309760

(51) Int. Cl.
*C03B 37/018*    (2006.01)
(52) U.S. Cl. ............... 65/407; 65/413; 65/421; 65/427
(58) Field of Classification Search .............. 65/407, 65/413, 421, 427
See application file for complete search history.

(56) References Cited

U.S. PATENT DOCUMENTS

| | | | | |
|---|---|---|---|---|
| 4,195,980 A | * | 4/1980 | Sterling et al. | 65/392 |
| 4,230,472 A | * | 10/1980 | Schultz | 65/416 |
| 5,788,734 A | * | 8/1998 | Hoshino et al. | 65/385 |

(Continued)

FOREIGN PATENT DOCUMENTS

| | | |
|---|---|---|
| JP | 61-091034 A | 5/1986 |
| JP | 10-81535 | 3/1998 |
| JP | 2005-89241 | 4/2005 |
| JP | 2005-200270 | 7/2005 |

(Continued)

OTHER PUBLICATIONS

Machine translation of JP 2005-200270, Watanabe Morio, Method for Manufacturing Optical Fiber, Jul. 28, 2005.*

(Continued)

*Primary Examiner* — Queenie Dehghan
(74) *Attorney, Agent, or Firm* — McGinn Intellectual Property Law Group, PLLC

(57) ABSTRACT

Provided are a manufacturing method of an optical fiber base material and an optical fiber base material manufactured in the manufacturing method, the manufacturing method including: a process of combining at least two core base materials 70 by fusion-bonding to produce a single core base material; a process of fusion-bonding a pair of dummy glass rods 61 and 62 at both ends of the core base material 70 to produce a starting glass rod; a process of depositing, at an outer surface of the starting glass rod, glass particles generated by flame hydrolysis, to produce a porous base material 80; and a process of sintering and vitrifying, into transparent glass, the porous base material 80, to produce an optical fiber base material 310 that includes a core portion and a clad portion.

5 Claims, 5 Drawing Sheets

U.S. PATENT DOCUMENTS

| | | | |
|---|---|---|---|
| 6,178,779 B1 * | 1/2001 | Drouart et al. | 65/391 |
| 6,434,975 B2 * | 8/2002 | Berkey | 65/403 |
| 2002/0078714 A1 | 6/2002 | Bird et al. | |
| 2003/0079503 A1 * | 5/2003 | Cook et al. | 65/407 |

FOREIGN PATENT DOCUMENTS

| | | |
|---|---|---|
| KR | 1020020096449 A | 12/2002 |

OTHER PUBLICATIONS

International Search Report dated Aug. 22, 2005.
Extended European Search Report dated Nov. 16, 2010.
Korean Office Action dated Mar. 6, 2012, with partial English translation.

* cited by examiner

BASE MATERIAL FOR OPTICAL FIBER AND METHOD FOR PRODUCTION THEREOF

TECHNICAL FIELD

The present invention relates to an optical fiber base material, an optical fiber, and a manufacturing method of the optical fiber base material and of the optical fiber. More specifically, the present invention relates to a manufacturing method of the optical fiber base material and to an optical fiber base material manufactured in the manufacturing method, where the manufacturing method includes: forming a porous base material by supplying a raw material gas in an oxyhydrogen flame and by depositing resulting glass particles onto a core base material; and further vitrifying the porous base material into transparent glass. The present invention further relates to a manufacturing method of an optical fiber employing the optical fiber base material, and to an optical fiber obtained in the manufacturing method.

The contents of Japanese Patent Application No. 2004-309760 filed on Oct. 25, 2004 is incorporated in the present application by reference if applicable in the designated state.

BACKGROUND ART

An optical fiber base material, which will become an optical fiber by being drawn, is manufactured by undergoing a core-portion manufacturing process of forming a core portion having a high refractive index, and a clad-portion manufacturing process of forming a clad portion on an outer surface of the core portion resulting from the core-portion manufacturing process, where the clad portion has a refractive index lower than the refractive index of the core portion.

FIG. 1 schematically shows a core-portion manufacturing apparatus 100 employed in the core-portion manufacturing process. When a raw material gas that contains $SiCl_4$ and $GeCl_4$ is supplied into a burner 21 within a process chamber 11 together with a combustion gas that contains hydrogen and oxygen, $GeO_2$ doped glass particles $SiO_2$ are generated by means of flame hydrolysis such as shown in the following equation:

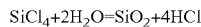

$SiCl_4+2H_2O=SiO_2+4HCl$

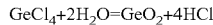

$GeCl_4+2H_2O=GeO_2+4HCl$

Thus generated glass particles are attached and deposited to a tip of a starting target material 30 rotating within the process chamber 11. In view of this, a tip of an object created by deposition is monitored by means of a monitor 55 to perform feedback control. Then according to the growth of the deposition object, the starting target material 30 is pulled out. In this way, a porous core base material 40, in which glass particles aggregate, is formed. During this process, unattached glass particless will be discharged through an exhaust tube 51 to outside the system.

On the other hand, the porous core base material 40 after undergoing the deposition process is subjected to a sintering process where dehydration and vitrification into transparent glass are performed, thereby being completed as a core base material. This core base material is sometimes made from a material of the core portion solely, or is made from combination of a material corresponding to a part of the clad portion and the material of the core portion in other times.

FIG. 2 schematically shows a clad-portion manufacturing apparatus 200 employed in the clad-portion manufacturing process performed by using a core base material 70 manufactured in the core manufacturing process. First, dummy glass rods 61 and 62 are fusion-bonded to both ends of the core base material 70 elongated into prescribed length and diameter, to prepare a starting glass rod.

Next, a raw material gas containing $SiCl_4$ is supplied together with a combustion gas containing hydrogen and oxygen into one or more burners 22 within the process chamber 12 in which the starting glass rod is being rotated, thereby generating glass particles. Thus generated glass particles are deposited on the outer surface of the core base material 70 of the starting glass rod. During this process, by reciprocation of the burners 22 along the axial direction of the core base material 70 as shown by the arrow in the drawing, the glass particles are deposited to the entire length of the core base material 70 uniformly.

FIG. 3 shows an optical fiber base material 30 obtained in the above way. As shown in this drawing, a porous base material 80 is formed on the outer surface of the core base material 70. Note that glass particles not attached to the porous base material 80 are discharged through an exhaust tube 52 of the clad-portion manufacturing apparatus 200 (shown in FIG. 2) to outside the system. In addition, the porous base material 80 after undergoing the deposition is subjected to the next sintering process where dehydration and vitrification into transparent glass are performed, thereby being completed as an optical fiber base material.

DISCLOSURE OF THE INVENTION

Problems to be Solved by the Invention

In the manufacturing method of optical fiber base material and optical fiber stated above, the size of the porous core base material 40 manufacturable in the core-portion manufacturing process is limited from the perspective of equipment and technology requirements. For example, the process chamber 11 is installed in the lengthwise direction within a clean room, and so its size is limited to the size of a building. In addition, for manufacturing a porous core base material 40, it is necessary to decrease pressure within the process chamber 11, and to produce a predetermined gas atmosphere at the same time. Therefore, if huge facilities are installed, the equipment cost becomes accordingly huge, leading to a sharp rise in the manufacturing cost of the porous core base material 40.

In this way, the size of a manufacturable porous core base material 40 has certain limitations. Accordingly, the size of an optical fiber base material 300 manufactured from a starting glass rod using the porous core base material 40 is also subjected to the limitations. Moreover, since the size of the optical fiber base material 300 has a limitation, the productivity improvement of manufacturing the optical fiber has been limited accordingly.

In view of the above-stated problems, the present invention, as one aspect thereof, aims to provide a manufacturing method of an optical fiber base material and a manufacturing method of an optical fiber, which are able to manufacture a large optical fiber base material with ease, to improve the productivity in respective manufacturing processes of an optical fiber base material and of an optical fiber, and further to contribute to cost reduction of the optical fiber. Furthermore, one aspect of the present invention is to provide an optical fiber base material manufactured using such a method, and an optical fiber manufactured using the optical fiber base material.

Means for Solving the Problems

As the first embodiment, the present invention provides a manufacturing method of an optical fiber base material, including: combining at least two core base materials by fusion-bonding to produce a single core base material; fusion-bonding a pair of dummy glass rods at both ends of the single core base material to produce a starting glass rod; depositing, at an outer surface of the starting glass rod, glass particles generated by flame hydrolysis, to produce a porous base material; and sintering and vitrifying, into transparent glass, the porous base material, to produce an optical fiber base material that includes a core portion and a clad portion. Accordingly, it becomes possible to manufacture a large optical fiber base material.

Further, as the second embodiment, the present invention provides an optical fiber base material manufactured using the manufacturing method as stated above. Accordingly, it becomes possible to obtain a longer optical fiber than those resulting from a single continuous drawing process.

As the third embodiment, the present invention provides a manufacturing method of an optical fiber, including continuously drawing the optical fiber base material as described above without dividing the optical fiber base material at a portion where the core base materials have been fusion-bonded. Accordingly, it becomes possible to reduce discontinuous operations and material loss generated inevitably at the starting and the ending of a drawing process.

Further, as the fourth embodiment, the present invention provides an optical fiber manufactured using the manufacturing method as stated above. This optical fiber is a single optical fiber manufactured by performing continuous drawings to one optical fiber base material. In addition, the optical fiber has a long entire length without any connection, and has stable diameter and quality throughout the entire length.

Effect of the Invention

According to the manufacturing method of optical fiber base material as stated above, it becomes possible to save the amount of dummy glass rods to be fusion-bonded to both ends of a core base material. Moreover, since it becomes possible to thicken the diameter of a starting glass rod, it becomes accordingly possible to increase the attachment speed of glass particles.

Furthermore, the product weight of manufactured optical fiber base materials increases. As a result, process cost is lowered per unit product weight in the processing process with use of a glass lathe, the inspection process, and the drawing process, and so on, leading to productivity improvement. Furthermore, in the drawing process of optical fiber, diameter fluctuation of optical fibers becomes small, and an optical fiber corresponding to two conventional optical fibers is able to be subjected to drawing continuously. Consequently, the arrangement work for drawing is less troublesome, reducing cost of optical fibers.

Figure 1:
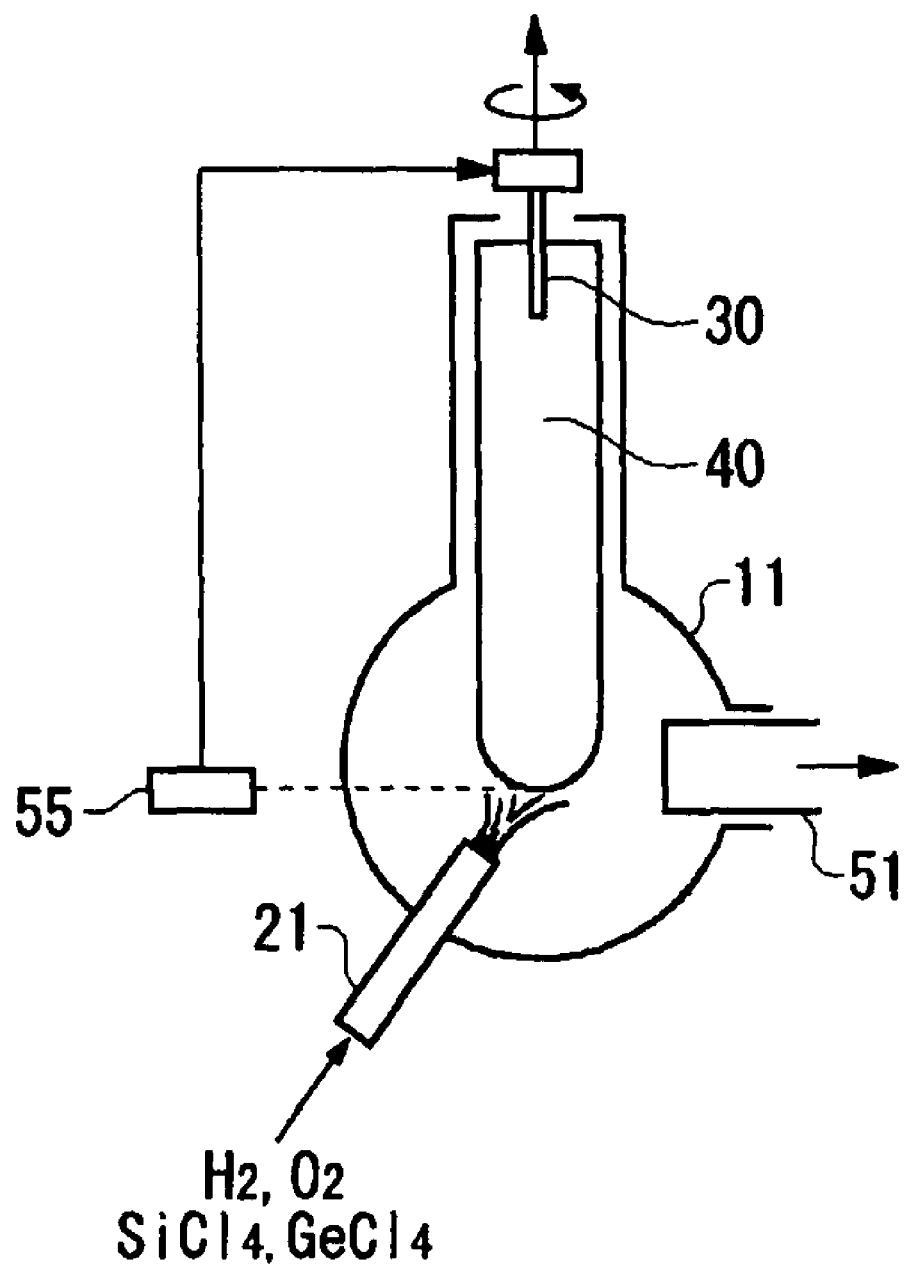
FIG. 1 is a schematic explanatory diagram showing an overview of a core-portion manufacturing apparatus 100.

EXPLANATION OF REFERENCE NUMERALS 11,12: process chamber
21,22: burner
30: starting target material
40: porous core base material
51,52: exhaust tube
55: monitor
61,62: dummy glass rod
70: core base material
80: porous base material
90: core base material fusion-bonded portion
95: optical fiber base material fusion-bonded portion
100: core-portion manufacturing apparatus
200,210: clad-portion manufacturing apparatus
300,310,400: optical fiber base material

BEST MODE FOR CARRYING OUT THE INVENTION

Figure 2:
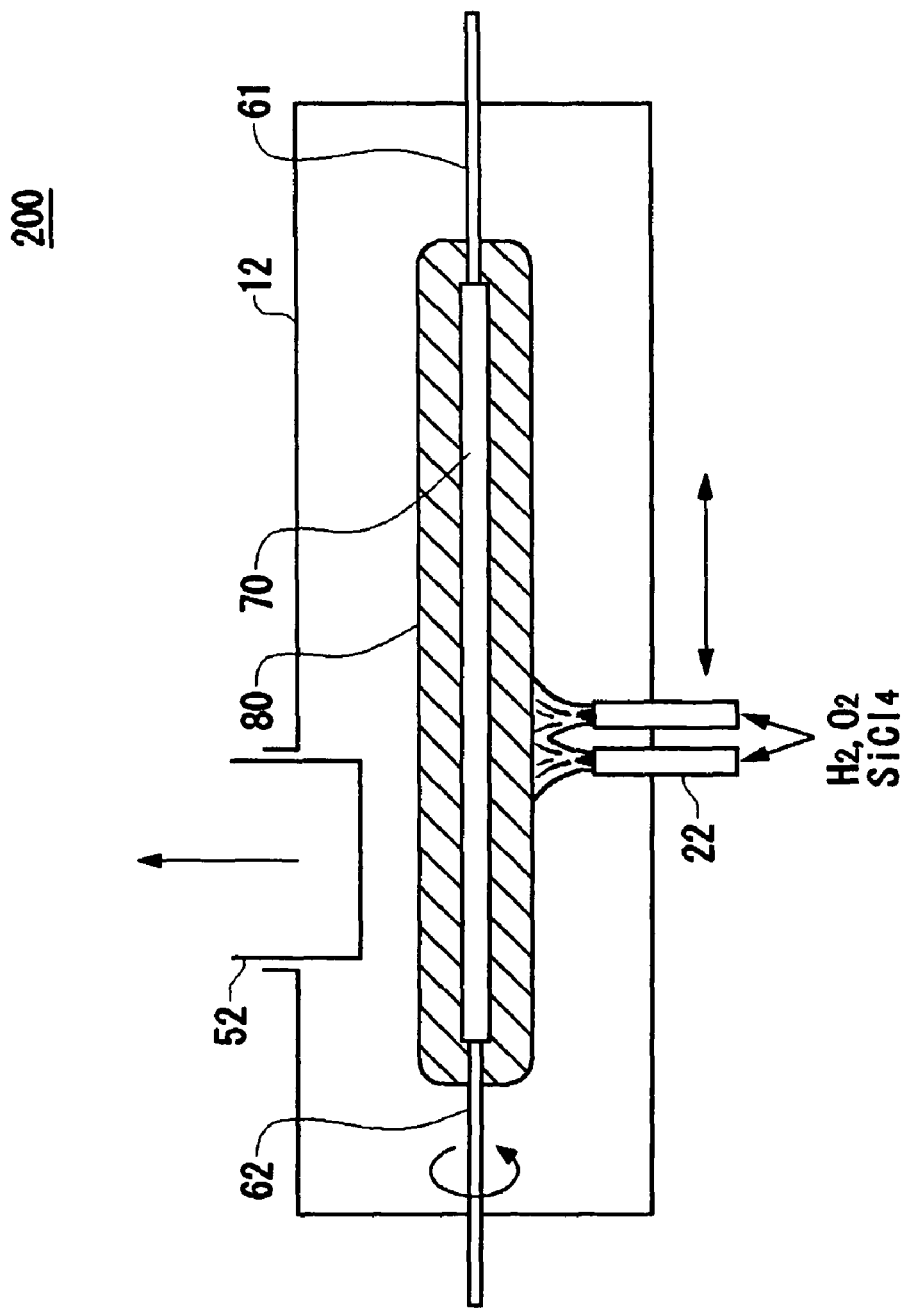
FIG. 2 is a schematic explanatory diagram showing an overview of a clad-portion manufacturing apparatus 200.
Figure 3:
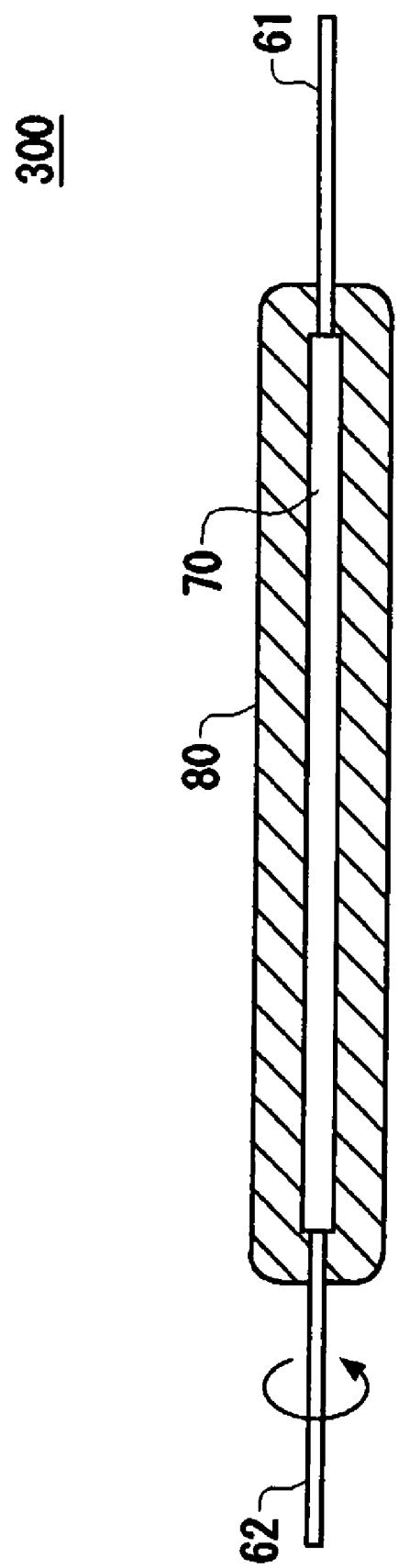
FIG. 3 is a schematic sectional diagram showing an optical fiber base material 300.
Figure 4:
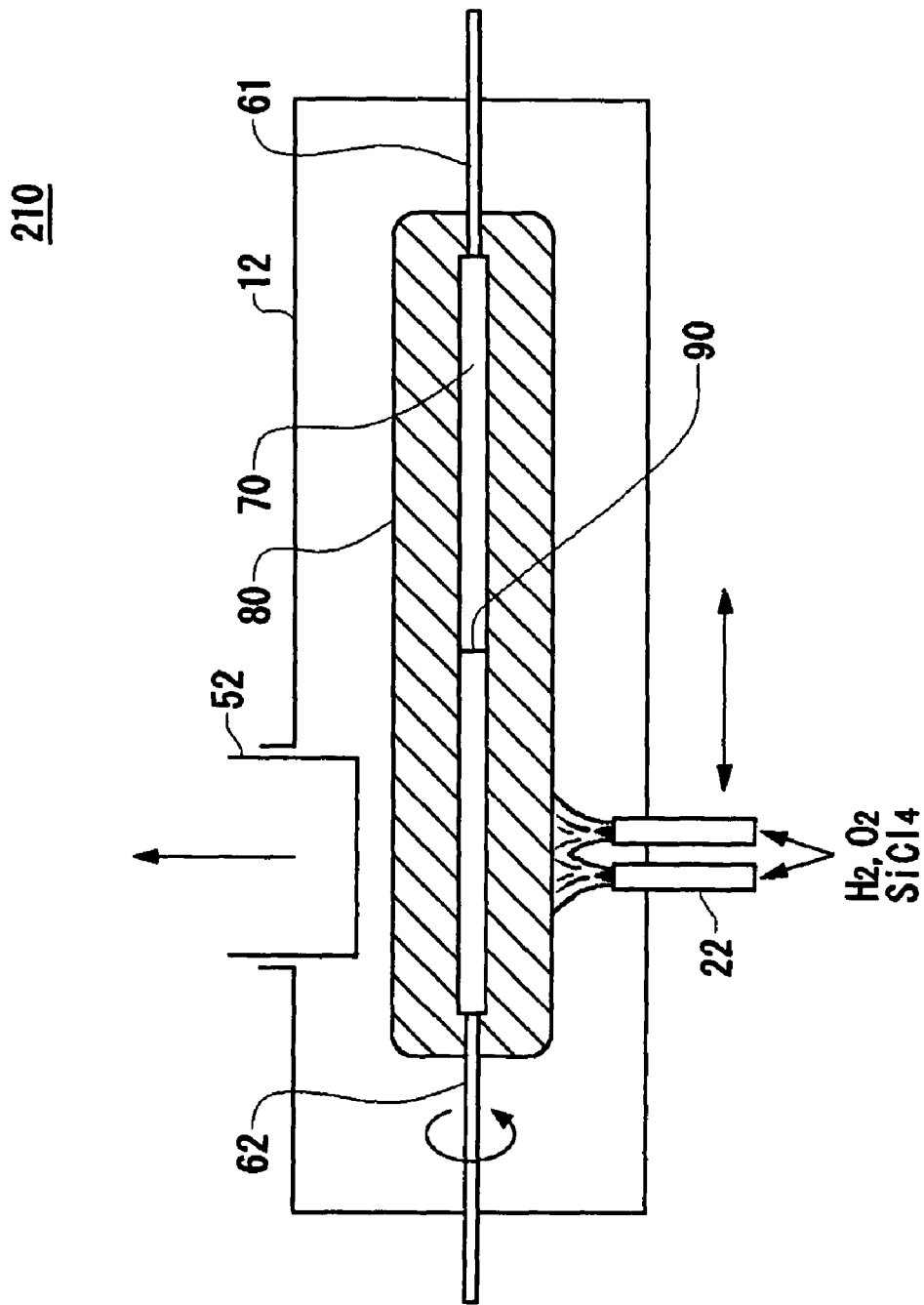
FIG. 4 is a schematic sectional diagram showing a clad-portion manufacturing apparatus 210 that performs a method of the present invention

As follows, the present invention is described by way of embodiment examples and comparison examples.
[Embodiment Examples]
Embodiment Example 1
A porous base material 80 is formed by using the clad-portion manufacturing apparatus 210 shown in FIG. 4. The same constituting elements common to the counterparts of the clad-portion manufacturing apparatus 200 shown in FIG. 2 are assigned with the same reference numerals, and overlapping explanation thereof is omitted.

First, two core base materials 70 manufactured in a general core-portion manufacturing process already explained with reference to FIG. 1 are combined by fusion-bonding to yield one core base material. After this, the core base material is elongated to a prescribed length and diameter. Next, dummy glass rods 61 and 62 are respectively fusion-bonded to both ends thereof, so as to complete a starting glass rod. Thus obtained starting glass rod is adjusted so that the outer diameter of the core base material fusion-bonded portion 90 between the core base materials 70 is within the range of ±0.5 mm relative to the outer diameter of the core base materials 70. Note that when the starting glass rod does not reach a desired length, it is possible to lengthen the starting glass rod by increasing the number of fusion-bonded core base materials 70.

Next, while installing and rotating the starting glass rod within the process chamber 12, one or more burners 22, which generate an oxyhydrogen flame that includes a raw material, are reciprocated therealong, thereby depositing the porous base material 80 on the outer surface of the core base materials 70, where the starting glass rod includes the core base materials 70 and has been lengthened to a prescribed length by fusion-bonding. This porous base material 80 is then sintered to undergo dehydration and vitrification into transparent glass.

Figure 5:
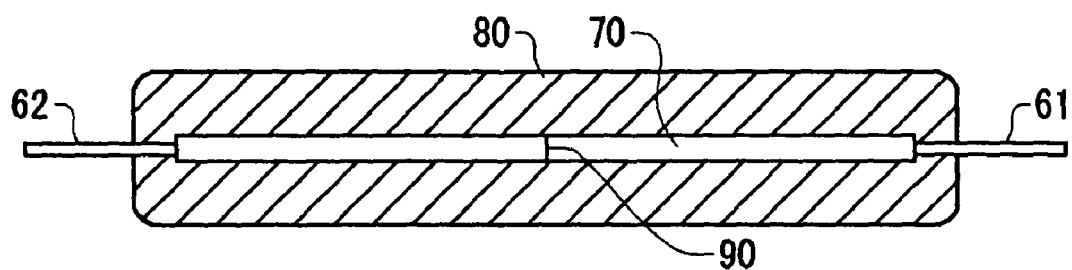
FIG. 5 is a schematic sectional diagram showing an optical fiber base material 310.

FIG. 5 shows an optical fiber base material 310 obtained in the above manner. This optical fiber base material 310 was confirmed to have a fluctuation width of outer diameter restrained within the range of ±0.5 mm at the fusion-bonded portion 90 of the core base materials 70. Moreover, the resulting optical fiber base material 310 was confirmed to have stable quality, and a thicker diameter than those obtained using a starting glass rod formed by a single core base material 70.

The amount of the dummy glass rods 61 and 62 employed to form this optical fiber base material 310 was restrained to ½ of the conventional cases for each 1 core base material 70. In addition, due to fusion-bonding of two core base materials 70, the diameter of the starting glass rod has been made thick, which has improved the attaching speed of glass particles thereto by 20%. Note that if the capacity of the manufacturing apparatus so permits, it is also possible to create a larger size starting glass rod, not only thickening the starting glass rod.

Furthermore, the obtained single optical fiber base material 310 has an increased size and weight. For this reason, the cost per unit product weight was lowered which is incurred in other processes that include an inspection process such as a refractive index distribution measurement and an appearance inspection, a processing process by means of a glass lathe, and a drawing process, leading to improved productivity of optical fibers.

Additionally in the drawing process, diameter fluctuation of optical fibers is small, and the optical fiber base material 310 corresponding to two conventional optical fibers was able to be continuously drawn without being cut at the core base material fusion-bonded portion 90. Moreover, the arrangement work for drawing was less troublesome.

Furthermore, it is possible to reduce the price of an optical fiber obtained in the above-stated manufacturing method because of productivity improvement. In addition, since the optical fiber is manufactured by subjecting a single optical fiber base material 310 to continuous drawing, the quality was confirmed to be stable for the entire length thereof.

COMPARISON EXAMPLE 1

Figure 6:
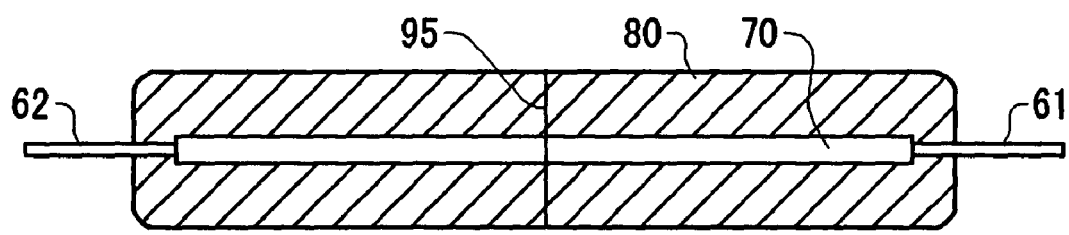
FIG. 6 is a schematic sectional diagram showing an optical fiber base material 400 according to a comparison example.

FIG. 6 shows a sectional view of an optical fiber base material 400 created as a comparison example. As shown in this drawing, this optical fiber base material 400 is an integral body resulting by combining two optical fiber base materials respectively manufactured independently by fusion-bonding. This optical fiber base material 400 is also an integral body created by fusion-bonding, to a core base material 70, a portion to be a clad portion attached as a porous base material 80.

In the optical fiber base material 400 manufactured in this way, $GeO_2$ contained in the core 70 diffused in the side of the porous base material 80 at the time of the fusion-bonding. For this reason, at the time of drawing, melting progressed too much at the optical fiber base material fusion-bonded portion 95, and the fluctuation width of the optical fiber diameter in the vicinity thereof has become large. In addition, there were cases where cutting has caused to interrupt the drawing process.

INDUSTRIAL APPLICABILITY

According to the present invention, a single large optical fiber base material is manufactured without significant modification to the manufacturing equipment. Furthermore by performing continuous drawing using a large optical fiber base material manufactured in this way, it is possible to manufacture a continuous and long optical fiber. Accordingly, it is possible to reduce the manufacturing cost of the optical fiber base material and of the optical fiber.

The invention claimed is:

1. A manufacturing method of an optical fiber base material, comprising:
    combining at least two core base materials by fusion-bonding to produce a single core base material;
    fusion-bonding a pair of dummy glass rods at both ends of the single core base material to produce a starting glass rod;
    depositing at an outer surface of the starting glass rod, glass particles generated by flame hydrolysis, to produce a porous base material;
    sintering and vitrifying, into transparent glass, the porous base material, to produce an optical fiber base material that includes a core portion and a clad portion; and
    removing the optical fiber base material from an apparatus in which the optical fiber base material was manufactured.

2. The manufacturing method as set forth in claim 1, further comprising lengthening the starting glass rod by increasing a number of the at least two core base materials.

3. The manufacturing method as set forth in claim 1, wherein the produced optical fiber base material has a fluctuation width of outer diameter restrained within a range of ±0.5 mm at the core base material fusion-bonded portion.

4. The manufacturing method as set forth in claim 1, wherein said combining at least two core base materials is performed such that an outer diameter of a core base material fusion-bonded portion between the core base materials is maintained within a range of ±0.5 mm relative to an outer diameter of the core base materials.

5. A manufacturing method of an optical fiber, comprising:
    combining at least two core base materials by fusion-bonding to produce a single core base material;
    fusion-bonding a pair of dummy glass rods at both ends of the single core base material to produce a starting glass rod;
    depositing at an outer surface of the starting glass rod, glass particles generated by flame hydrolysis, to produce a porous base material;
    sintering and vitrifying, into transparent glass, the porous base material, to produce an optical fiber base material that includes a core portion and a clad portion;
    removing the optical fiber base material from an apparatus in which the optical fiber base material was manufactured; and
    continuously drawing the optical fiber base material without dividing the optical fiber base material at a portion where the core base materials have been fusion-bonded.

* * * * *